US012075811B2

(12) United States Patent
Bilat

(10) Patent No.: US 12,075,811 B2
(45) Date of Patent: Sep. 3, 2024

(54) HEATER MANAGEMENT

(71) Applicant: Philip Morris Products S.A., Neuchatel (CH)

(72) Inventor: Stephane Bilat, Areuse (CH)

(73) Assignee: Philip Morris Products S.A., Neuchatel (CH)

( * ) Notice: Subject to any disclaimer, the term of this patent is extended or adjusted under 35 U.S.C. 154(b) by 695 days.

(21) Appl. No.: 17/146,648

(22) Filed: Jan. 12, 2021

(65) Prior Publication Data

US 2021/0212170 A1 Jul. 8, 2021

Related U.S. Application Data

(63) Continuation of application No. 15/560,192, filed as application No. PCT/EP2016/056175 on Mar. 21, 2016, now Pat. No. 10,925,315.

(30) Foreign Application Priority Data

Mar. 26, 2015 (EP) .................................... 15161202

(51) Int. Cl.
*A24B 15/167* (2020.01)
*A24F 40/40* (2020.01)
(Continued)

(52) U.S. Cl.
CPC ............ *A24B 15/167* (2016.11); *A24F 40/40* (2020.01); *A24F 40/53* (2020.01); *H05B 1/0297* (2013.01); *A24F 40/10* (2020.01)

(58) Field of Classification Search
CPC ........ A24B 15/167; A24F 40/40; A24F 40/53; A24F 40/10; A24F 40/46; A24F 40/42;
(Continued)

(56) References Cited

U.S. PATENT DOCUMENTS 9,423,152 B2 8/2016 Ampolini
9,498,000 B2 11/2016 Kuczaj
(Continued)

FOREIGN PATENT DOCUMENTS

CN 103338663 A 10/2013
CN 103338665 A 10/2013
(Continued)

OTHER PUBLICATIONS

International Search Report and Written Opinion issued Sep. 15, 2016 in PCT/EP2016/056175, filed Mar. 21, 2016.
(Continued)

*Primary Examiner* — Alexander Gilman
(74) *Attorney, Agent, or Firm* — Oblon, McClelland, Maier & Neustadt, L.L.P.

(57) ABSTRACT

An electrically operated aerosol-generating system is provided, including an electric heater including a heating element configured to heat an aerosol-forming substrate; a power supply; and electric circuitry for an electrically operated aerosol-generating device, in use the electric circuitry being connected to the heater and to the power supply, the electric circuitry including a memory, and being configured to measure an initial resistance, or an initial rate of change of resistance, of the heater within a predetermined time period after power is supplied to the heater, to compare the initial resistance or the initial rate of change of resistance of the heater with a range of acceptable values, and if the initial resistance or the initial rate of change of resistance is outside the range, to prevent the supply of power to the heater, or provide an indication, until the heater or the substrate is replaced.

13 Claims, 7 Drawing Sheets

(51) Int. Cl.

| | |
|---|---|
| ***A24F 40/53*** | (2020.01) |
| ***H05B 1/02*** | (2006.01) |
| *A24F 40/10* | (2020.01) |

(58) Field of Classification Search
CPC .......... A24F 40/51; A24F 40/57; A24F 40/90; A24F 47/00; H05B 1/0297
USPC ........................................................ 131/329
See application file for complete search history.

(56) References Cited

U.S. PATENT DOCUMENTS

| | | | | |
|---|---|---|---|---|
| 9,713,345 | B2* | 7/2017 | Farine | A24F 40/57 |
| 9,872,521 | B2* | 1/2018 | Farine | A24F 40/53 |
| 10,031,183 | B2 | 7/2018 | Novak, III | |
| 10,470,496 | B2* | 11/2019 | Bernauer | H05B 1/0291 |
| 10,925,315 | B2* | 2/2021 | Bilat | A24F 40/40 |
| 11,541,193 | B2* | 1/2023 | Lee | H05B 1/0227 |
| 2002/0060150 | A1 | 5/2002 | Hashimoto | |
| 2002/0078938 | A1 | 6/2002 | Hada | |
| 2006/0279349 | A1 | 12/2006 | Grudin | |
| 2011/0095010 | A1 | 4/2011 | Bondarowicz et al. | |
| 2011/0265806 | A1 | 11/2011 | Alarcon et al. | |
| 2012/0010845 | A1 | 1/2012 | Bohan | |
| 2013/0042865 | A1 | 2/2013 | Monsees et al. | |
| 2014/0014126 | A1 | 1/2014 | Peleg et al. | |
| 2014/0020693 | A1 | 1/2014 | Cochand et al. | |
| 2014/0338685 | A1* | 11/2014 | Amir | H05B 1/0244 131/329 |
| 2015/0053214 | A1 | 2/2015 | Alarcon et al. | |
| 2015/0059779 | A1 | 3/2015 | Alarcon et al. | |
| 2015/0237916 | A1* | 8/2015 | Farine | A24F 40/53 219/492 |
| 2016/0192706 | A1 | 7/2016 | Kananen | |
| 2016/0316822 | A1 | 11/2016 | Liu | |
| 2016/0331038 | A1* | 11/2016 | Farine | G05D 23/1919 |
| 2016/0374398 | A1 | 12/2016 | Amir | |
| 2017/0251728 | A1 | 9/2017 | Peleg | |

FOREIGN PATENT DOCUMENTS

| | | | |
|---|---|---|---|
| CN | 203618777 | U | 6/2014 |
| CN | 203618789 | U | 6/2014 |
| CN | 104116138 | A | 10/2014 |
| CN | 104470386 | A | 3/2015 |
| CN | 105027016 | A | 11/2015 |
| EP | 2 110 033 | A1 | 10/2009 |
| EP | 2 468 116 | A1 | 6/2012 |
| EP | 2 468 117 | A1 | 6/2012 |
| EP | 2 759 771 | A1 | 7/2014 |
| JP | 2004-319953 | A | 11/2004 |
| JP | 2011-515093 | A | 5/2011 |
| JP | 2013-35724 | A | 2/2013 |
| JP | 2014-501105 | A | 1/2014 |
| JP | 2014-507496 | A | 3/2014 |
| WO | 2012/085203 | A1 | 6/2012 |
| WO | 2012/085207 | A1 | 6/2012 |
| WO | WO 2012/165174 | A1 | 12/2012 |
| WO | 2014/040988 | A2 | 3/2014 |
| WO | 2014/040988 | A3 | 3/2014 |
| WO | WO 2014/060268 | A1 | 4/2014 |
| WO | 2014/138244 | A1 | 9/2014 |
| WO | 2014/150247 | A1 | 9/2014 |
| WO | 2014/150979 | A2 | 9/2014 |
| WO | 2014/150979 | A3 | 9/2014 |
| WO | WO 2014/203083 | A2 | 12/2014 |
| WO | 2016/030661 | A1 | 3/2016 |

OTHER PUBLICATIONS

Extended European Search Report issued Nov. 13, 2015 in Patent Application No. 15161202.5.

Combined Chinese Office Action and Search Report issued Nov. 4, 2019 in Chinese Patent Application No. 201680015396.4 (with English translation), citing documents BP through BT therein, 28 pages.

Philippines Office Action issued Feb. 28, 2020 in Philippines Patent Application No. 1-2017-501285, citing document AG therein, 4 pages.

Japanese Office Action issued on Apr. 20, 2020 in Patent Application No. 2017-548108 (with English translation), citing documents BU—BW therein, 9 pages.

Combined Chinese Office Action and Search Report issued Oct. 14, 2023 in Chinese Patent Application No. 202110123159.2 (with English Translation), citing reference 15 therein, 11 pages.

U.S. Appl. No. 15/560,192, filed Sep. 21, 2017, 2018/0303161 A1, Stephane Bilat.

Babu, S.S., et al., "Empirical model of effects of pressure and temperature on electrical contact resistance of metals", Science and Technology of Welding and Joining, 2001, vol. 6 No. 3, pp. 126-132.

European Oral Proceedings of Letter from the opponent issued Jun. 14, 2023 in European Patent Application No. 16711269.7, citing reference 15 therein, 11 pages.

Combined Chinese Office Action and Search Report issued Jun. 1, 2023 in Chinese Patent Application No. 202110123296.6 (with English Translation), citing reference 15 therein, 20 pages.

Japanese Notice of Reasons for Refusal mailed on Apr. 1, 2024, issued in Japanese Patent Application No. 2023-022182, with English Translation, total 4 pages (citing documents 15 and 16, therein).

Canadian Office Action mailed on Jun. 13, 2024 issued in Canadian Patent Application No. 3,184,421, total 5 pages.

* cited by examiner

HEATER MANAGEMENT

CROSS REFERENCE TO RELATED APPLICATIONS

This application is a continuation application of and claims the benefit of priority under U.S.C. § 120 to U.S. application Ser. No. 15/560,192, filed on Sep. 21, 2017, which is a U.S. National Stage application of PCT/EP2016/056175, filed on Mar. 21, 2016, and claims benefit of priority under 35 U.S.C. § 119 from EP 15161202.5, filed on Mar. 26, 2015, the entire contents of each of which are incorporated herein by reference.

TECHNICAL FIELD

The present invention relates to heater management. Particular examples disclosed relate to heater management in an electrically heated aerosol-generating system. Aspects of the invention are directed to an electrically heated aerosol-generating system and a method for operating an electrically heated aerosol-generating system. Some examples described relate to a system that can detect abnormal changes in the electrical resistance of a heater element, which may be indicative of adverse conditions at the heater element. Adverse conditions may for example be indicative of a depleted level of aerosol-forming substrate in the system. In some examples described, the system may be effective with heater elements of different electrical resistance. In other examples, detected features of the electrical resistance may be used to determine or select how the system may be operated. Some aspects and features of the invention have particular application to electrically heated smoking systems.

DESCRIPTION OF THE RELATED ART

WO 2012/085203 discloses an electrically heated smoking system comprising a liquid storage portion for storing liquid aerosol-forming substrate; an electric heater comprising at least one heating element for heating the liquid aerosol-forming substrate; and electric circuitry configured to determine depletion of liquid aerosol-forming substrate based on a relationship between a power applied to the heating element and a resulting temperature change of the heating element. In particular, the electric circuitry is configured to calculate a rate of temperature rise of the heating element, wherein a high rate of temperature rise is indicative of a drying out of a wick that conveys the liquid aerosol-forming substrate to the heater. The system compares the rate of temperature rise with a threshold value stored in memory during manufacture. If the rate of temperature rise exceeds the threshold then the system may stop supplying power to the heater.

The system of WO2012/085203 can use the electrical resistance of the heater element to calculate the temperature of the heating element, which has the advantage of not requiring a dedicated temperature sensor. However, the system still requires storage of a threshold that is dependent on the resistance of the heater element, and so is optimised for heater elements having a particular electrical resistance or range of resistance.

However, it may be desirable to allow the system to operate with different heaters. Typically in a system of the type described in WO2012/085203, the heater is provided in a disposable cartridge together with a supply of the liquid aerosol-forming substrate. The heater elements in different cartridges may have different electrical resistances. That may be a result of manufacturing tolerances in cartridges of the same type or because different cartridge designs are available for use in the system to provide different user experiences. The system of WO2012/085203 is optimised for a heater having a known, particular electrical resistance to be used in the system, which is determined at the time of manufacture of the system.

It would be desirable to have an alternative system for determining drying out of a heater, or other adverse conditions at the heater, in an electrical smoking system and in particular a system that is operable with different heaters.

In electrically heated aerosol-generating systems having a permanent device portion and a consumable portion that contains the aerosol-forming substrate, it would also be desirable to be able to readily determine if the consumable portion is "genuine" or is a consumable that is considered compatible with the device by the manufacturer of the device. This is true both in systems in which the heater is part of the consumable and in systems in which heater is part of the permanent device.

SUMMARY

In a first aspect, there is provided an electrically operated aerosol-generating system comprising:

- an electric heater comprising at least one heating element for heating an aerosol-forming substrate;
- a power supply; and
- electric circuitry connected to the electric heater and to the power supply and comprising a memory, the electric circuitry configured to determine an adverse condition when a ratio between an initial electrical resistance of the heater and a change in electrical resistance from the initial resistance is greater than a maximum threshold value or is less than a minimum threshold value stored in the memory, or when the ratio reaches a threshold value stored in the memory outside of an expected time period, and to control the power supplied to the electric heater based on whether there is an adverse condition, or to provide an indication based on whether there is an adverse condition.

It should be clear that the phrase "when the ratio reaches a threshold value stored in the memory outside of an expected time period" covers both the situation when the ratio reaches the threshold value sooner than the expected time period and the situation when the ratio reaches the threshold value later than the expected time period or does not reach the threshold value at all.

BRIEF DESCRIPTION OF THE DRAWINGS

Embodiments in accordance with the present invention will now be described in detail, by way of example only, with reference to the accompanying drawings, in which.

DETAILED DESCRIPTION

Figure 1A:
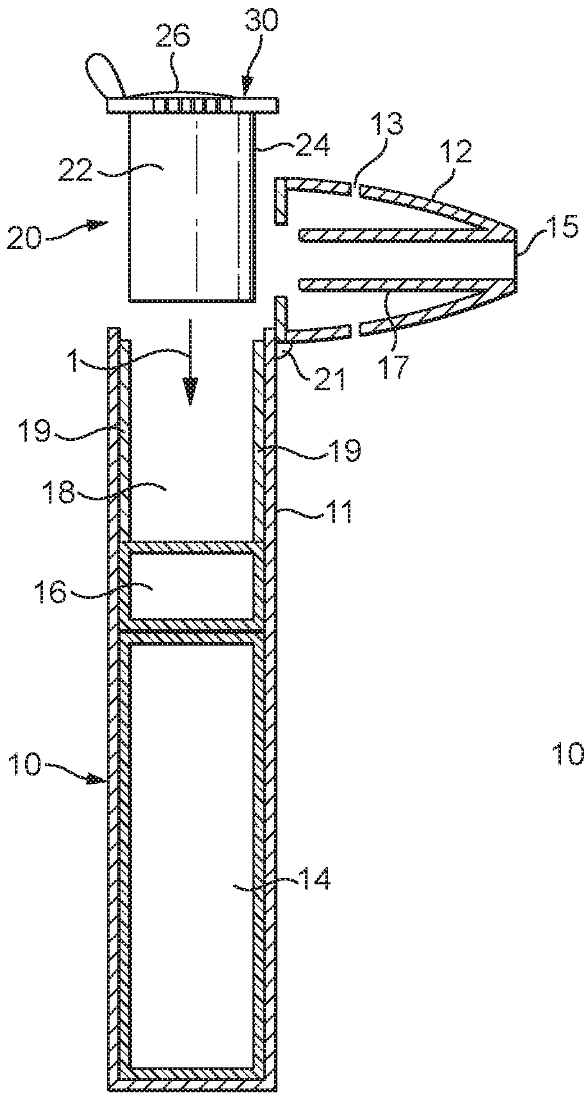
FIGS. 1A to 1D are schematic illustrations of a system in accordance with an embodiment of the invention.

One adverse condition in an aerosol-generating system or aerosol-generating device is insufficient or depleted aerosol-forming substrate at the heater. In general terms, the less aerosol-forming substrate is delivered to the heater for vaporisation, the higher the temperature of the heating element will be for a given applied power. For a given power, the evolution of the temperature of the heating element during a heating cycle, or how that evolution changes over a plurality of heating cycles, can be used to detect if there has been a depletion in the amount of aerosol-forming substrate at the heater, and in particular if there is insufficient aerosol-forming substrate at the heater.

Another adverse condition is the presence of a counterfeit or incompatible heater, or a damaged heater in a system that has a replicable or disposable heater. If the heater element resistance rises more quickly or more slowly than expected for a given applied power, it might be because the heater is counterfeit and has different electrical properties to a genuine heater, or it might be because the heater is damaged in some way. In either case, the electrical circuitry may be configured to prevent the supply of power to the heater.

Another adverse condition is the presence of a counterfeit, incompatible or old or damaged aerosol-forming substrate in the system. If the heater element resistance rises more quickly or more slowly than expected for a given applied power, it might be because the aerosol-forming substrate is counterfeit or old and so has a higher or lower moisture content than expected. For example, if a solid aerosol-forming substrate is used, if it is very old or has been incorrectly stored, it might become dry. If the substrate is dryer than expected, less energy than expected will be used vapourising and the heater temperature will rise more quickly. This will result in an unexpected change in the electrical resistance of the heater element.

By using a ratio of an initial resistance and a subsequent resistance, the system does not need to determine the actual temperature of the heating element or have any pre-stored knowledge of the resistance of the heating element at a given temperature. This allows different approved heaters to be used in the system and allows for variations in the absolute resistance of the same type of heater due to manufacturing tolerances, without triggering an adverse condition. It also allows for the detection of an incompatible heater.

Using an initial resistance measurement and a subsequent change of resistance also allows for more accurate thresholds to be set for determining particular adverse conditions. The ratio of the change of resistance to the initial resistance does not depend on variations in the size or shape of the heater due to manufacturing tolerances or on variations in parasitic contact resistances within the system, but only on the material properties of the heater and the aerosol-forming substrate.

The electric circuitry may not actually calculate the ratio or the change in electric resistance and compare the ratio with a threshold value, but may make an equivalent comparison of a measured resistance value with a threshold value derived from one or more stored values and one or more measured resistance values. For example, the electric circuitry may compare a measured electrical resistance of the heater element at a time after initial delivery of power to the electric heater from the power supply with a value calculated from the initial electrical resistance and a threshold value stored in memory.

The electric circuitry may be configured to measure an initial electrical resistance of the heater element and an electrical resistance of the heater element at a time after initial delivery of power to the electric heater from the power supply. If the time between the measurements of electrical resistance is known or determined, then a rate of change of resistance can be calculated, which for a given coefficient of resistance of the heater element, corresponds to the rate of change of temperature. The system may be configured always to supply the same power to the heater or the threshold or thresholds may be dependent on the power supplied to the heater.

The initial electrical resistance may be measured before first use of the heater. If the initial resistance is measured before first use of the heater then it can be assumed that the heater element is at around room temperature. As the expected change in resistance with time may depend on the initial temperature of the heater element, measuring initial resistance at or close to room temperature allows for narrower bands of expected behaviour to be set.

The initial resistance may be calculated as an initial measured resistance minus an assumed parasitic resistance resulting from other electrical components and electrical contacts within the system.

The system may comprise a device and a cartridge removably coupled to the device, wherein the power supply and the electric circuitry are in the device and the electric heater and an aerosol-forming substrate are in the removable cartridge. As used herein, the cartridge being "removably coupled" to the device means that the cartridge and device can be coupled and uncoupled from one another without significantly damaging either the device or the cartridge.

The electric circuitry may be configured to detect insertion and removal of a cartridge from the device. The electric circuitry may be configured to measure the initial electric resistance of the heater when the cartridge is first inserted into the device but before any significant heating has occurred. The electric circuitry may compare the measured initial resistance with a range of acceptable electrical resistance stored in the memory. If the initial resistance is outside the range of acceptable resistance it may be considered to be counterfeit, incompatible or damaged. In that case the electric circuitry may be configured to prevent the supply of power until the cartridge has been removed and replaced by a different cartridge.

Cartridges having different properties may be used with the device. For example, two different cartridges having different sized heaters may be used with the device. A larger heater may be used to deliver more aerosol for users that have that personal preference.

The cartridge may be refillable, or may be configured to be disposed of when the aerosol-forming substrate is exhausted.

The aerosol-forming substrate is a substrate capable of releasing volatile compounds that can form an aerosol. The volatile compounds may be released by heating the aerosol-forming substrate.

The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material. The aerosol-forming substrate may comprise homogenised tobacco material. The aerosol-forming substrate may comprise at least one aerosol-former. An aerosol-former is any suitable known compound or mixture of compounds that, in use, facilitates formation of a dense and stable aerosol and that is substantially resistant to thermal degradation at the operating temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1,3-butanediol and, most preferred, glycerine. The aerosol-forming substrate may comprise other additives and ingredients, such as flavourants.

The cartridge may comprise a liquid aerosol-forming substrate. For the liquid aerosol-forming substrate, certain physical properties, for example the vapour pressure or viscosity of the substrate, are chosen in a way to be suitable for use in the aerosol generating system. The liquid preferably comprises a tobacco-containing material comprising volatile tobacco flavour compounds which are released from the liquid upon heating. Alternatively, or in addition, the liquid may comprise a non-tobacco material. The liquid may include water, ethanol, or other solvents, plant extracts, nicotine solutions, and natural or artificial flavours. Preferably, the liquid further comprises an aerosol former. Examples of suitable aerosol formers are glycerine and propylene glycol.

An advantage of providing a liquid storage portion is that the liquid in the liquid storage portion is protected from ambient air. In some embodiments, ambient light cannot enter the liquid storage portion as well, so that the risk of light-induced degradation of the liquid is avoided. Moreover, a high level of hygiene can be maintained.

Preferably, the liquid storage portion is arranged to hold liquid for a pre-determined number of puffs. If the liquid storage portion is not refillable and the liquid in the liquid storage portion has been used up, the liquid storage portion has to be replaced by the user. During such replacement, contamination of the user with liquid has to be prevented. Alternatively, the liquid storage portion may be refillable. In that case, the aerosol generating system may be replaced after a certain number of refills of the liquid storage portion.

Alternatively, the aerosol-forming substrate may be a solid substrate. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise comminuting one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

A solid aerosol forming substrate may be provided as a smoking article, such as a cigarette, to be used with a device comprising the heater, power supply and electric circuitry.

The electric circuitry may be configured to detect insertion and removal of an aerosol-forming substrate from the device. The electric circuitry may be configured to measure the initial electric resistance of the heater when the aerosol-forming substrate is first inserted into the device but before any significant heating has occurred. The electric circuitry may compare the measured initial resistance with a range of acceptable electrical resistance stored in the memory. If the initial resistance is outside the range of acceptable resistance the aerosol-forming substrate may be considered to be counterfeit, incompatible or damaged. In that case the electric circuitry may be configured to prevent the supply of power until the aerosol-forming substrate has been removed and replaced.

The electric heater may comprise a single heating element. Alternatively, the electric heater may comprise more than one heating element, for example two, or three, or four, or five, or six or more heating elements. The heating element or heating elements may be arranged appropriately so as to most effectively heat the liquid aerosol-forming substrate.

The at least one electric heating element preferably comprises an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation. In composite materials, the electrically resistive material may optionally be embedded in, encapsulated or coated with an insulating material or vice-versa, depending on the kinetics of energy transfer and the external physicochemical properties required. The heating element may comprise a metallic etched foil insulated between two layers of an inert material. In that case, the inert material may comprise Kapton®, all-polyimide or mica foil. Kapton® is a registered trade mark of E.I. du Pont de Nemours and Company.

The at least one electric heating element may take any suitable form. For example, the at least one electric heating element may take the form of a heating blade. Alternatively, the at least one electric heating element may take the form of a casing or substrate having different electro-conductive portions, or an electrically resistive metallic tube. The liquid storage portion may incorporate a disposable heating element. Alternatively, one or more heating needles or rods that run through the liquid aerosol-forming substrate may also be suitable. Alternatively, the at least one electric heating element may comprise a flexible sheet of material. Other alternatives include a heating wire or filament, for example a Ni—Cr (Nickel-Chrome), platinum, tungsten or alloy wire, or a heating plate. Optionally, the heating element may be deposited in or on a rigid carrier material.

In one embodiment the heating element comprises a mesh, array or fabric of electrically conductive filaments. The electrically conductive filaments may define interstices between the filaments and the interstices may have a width of between 10 μm and 100 μm.

The electrically conductive filaments may form a mesh of size between 160 and 600 Mesh US (+/−10%) (i.e. between 160 and 600 filaments per inch (+/−10%)). The width of the interstices is preferably between 75 μm and 25 μm. The percentage of open area of the mesh, which is the ratio of the area of the interstices to the total area of the mesh is preferably between 25 and 56%. The mesh may be formed using different types of weave or lattice structures. Alternatively, the electrically conductive filaments consist of an array of filaments arranged parallel to one another.

The electrically conductive filaments may have a diameter of between 10 μm and 100 μm, preferably between 8 μm and 50 μm, and more preferably between 8 μm and 39 μm. The filaments may have a round cross section or may have a flattened cross-section.

The area of the mesh, array or fabric of electrically conductive filaments may be small, preferably less than or equal to 25 $mm^2$, allowing it to be incorporated in to a handheld system. The mesh, array or fabric of electrically conductive filaments may, for example, be rectangular and have dimensions of 5 mm by 2 mm. Preferably, the mesh or array of electrically conductive filaments covers an area of between 10% and 50% of the area of the heater assembly. More preferably, the mesh or array of electrically conductive filaments covers an area of between 15 and 25% of the area of the heater assembly.

The filaments may be formed by etching a sheet material, such as a foil. This may be particularly advantageous when the heater assembly comprises an array of parallel filaments. If the heating element comprises a mesh or fabric of filaments, the filaments may be individually formed and knitted together.

Preferred materials for the electrically conductive filaments are 304, 316, 304L, and 316L stainless steel.

The at least one heating element may heat the liquid aerosol-forming substrate by means of conduction. The heating element may be at least partially in contact with the substrate. Alternatively, the heat from the heating element may be conducted to the substrate by means of a heat conductive element.

Preferably, in use, the aerosol-forming substrate is in contact with the heating element.

Preferably, the electrically operated aerosol generating system further comprises a capillary material for conveying the liquid aerosol-forming substrate from the liquid storage portion to the electric heater element.

Preferably, the capillary material is arranged to be in contact with liquid in the liquid storage portion. Preferably, the capillary wick extends into the liquid storage portion. In that case, in use, liquid is transferred from the liquid storage portion to the electric heater by capillary action in the capillary wick. In one embodiment, the capillary wick has a first end and a second end, the first end extending into the liquid storage portion for contact with liquid therein and the electric heater being arranged to heat liquid in the second end. When the heater is activated, the liquid at the second end of the capillary wick is vaporized by the at least one heating element of the heater to form the supersaturated vapour. The supersaturated vapour is mixed with and carried in the air flow. During the flow, the vapour condenses to form the aerosol and the aerosol is carried towards the mouth of a user. The liquid aerosol-forming substrate has physical properties, including viscosity and surface tension, which allow the liquid to be transported through the capillary wick by capillary action.

The capillary wick may have a fibrous or spongy structure. The capillary wick preferably comprises a bundle of capillaries. For example, the capillary wick may comprise a plurality of fibres or threads or other fine bore tubes. The fibres or threads may be generally aligned in the longitudinal direction of the aerosol generating system. Alternatively, the capillary wick may comprise sponge-like or foam-like material formed into a rod shape. The rod shape may extend along the longitudinal direction of the aerosol generating system. The structure of the wick forms a plurality of small bores or tubes, through which the liquid can be transported by capillary action. The capillary wick may comprise any suitable material or combination of materials. Examples of suitable materials are capillary materials, for example a sponge or foam material, ceramic- or graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, nylon fibres or ceramic. The capillary wick may have any suitable capillarity and porosity so as to be used with different liquid physical properties. The liquid has physical properties, including but not limited to viscosity, surface tension, density, thermal conductivity, boiling point and vapour pressure, which allow the liquid to be transported through the capillary device by capillary action.

The heating element may be in the form of a heating wire or filament encircling, and optionally supporting, the capillary wick. The capillary properties of the wick, combined with the properties of the liquid, ensure that, during normal use when there is plenty of aerosol-forming substrate, the wick is always wet in the heating area.

Alternatively, as described, the heater element may comprise a mesh formed from a plurality of electrically conductive filaments. The capillary material may extend into interstices between the filaments. The heater assembly may draw liquid aerosol-forming substrate into the interstices by capillary action.

The housing may contain two or more different capillary materials, wherein a first capillary material, in contact with the heater element, has a higher thermal decomposition temperature and a second capillary material, in contact with the first capillary material but not in contact with the heater element has a lower thermal decomposition temperature. The first capillary material effectively acts as a spacer separating the heater element from the second capillary material so that the second capillary material is not exposed to temperatures above its thermal decomposition temperature. As used herein, "thermal decomposition temperature" means the temperature at which a material begins to decompose and lose mass by generation of gaseous by products. The second capillary material may advantageously occupy a greater volume than the first capillary material and may hold more aerosol-forming substrate that the first capillary material. The second capillary material may have superior wicking performance to the first capillary material. The second capillary material may be a less expensive or have a higher filling capability than the first capillary material. The second capillary material may be polypropylene.

The power source may be any suitable power source, for example a DC voltage source. In one embodiment, the power source is a Lithium-ion battery. Alternatively, the power source may be a Nickel-metal hydride battery, a Nickel cadmium battery, or a Lithium based battery, for example a Lithium-Cobalt, a Lithium-Iron-Phosphate, Lithium Titanate or a Lithium-Polymer battery. As an alternative, the power source may be another form of charge storage device such as a capacitor. The power source may require recharging and may have a capacity that allows for the storage of enough energy for one or more smoking experiences; for example, the power source may have sufficient capacity to allow for the continuous generation of aerosol for a period of around six minutes, corresponding to the typical time taken to smoke a conventional cigarette, or for a period that is a multiple of six minutes. In another example, the power source may have sufficient capacity to allow for a predetermined number of puffs or discrete activations of the heater.

Preferably, the aerosol generating system comprises a housing. Preferably, the housing is elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

Preferably, the aerosol generating system is portable. The aerosol generating system may be an electrically heated smoking system and may have a size comparable to a conventional cigar or cigarette. The aerosol generating system may be a smoking system. The smoking system may have a total length between approximately 30 mm and approximately 150 mm. The smoking system may have an external diameter between approximately 5 mm and approximately 30 mm.

The electric circuitry preferably comprises a microprocessor and more preferably a programmable microprocessor. The system may comprise a data input port or a wireless receiver to allow software to be uploaded onto the microprocessor. The electric circuitry may comprise additional electrical components. The system may comprise a temperature sensor.

If an adverse condition is detected, the system may do no more than provide an indication to a user that an adverse condition has been detected. This may be done by providing a visual, audible or haptic warning. Alternatively, or in addition, the electric circuitry may automatically limit or otherwise control the power supplied to the heater when an adverse condition is detected.

There are many possibly ways in which the electric circuitry can be configured control the power supplied to the electric heater if an adverse condition is detected. If insufficient aerosol-forming substrate is being delivered to the heating element, or a solid aerosol-forming substrate is becoming dry, then it may be desirable to reduce or stop the supply of power to the heater. This may be both to ensure that the user is provided with a consistent and enjoyable experience and to mitigate the risks of overheating and the generation of undesirable compounds in the aerosol. The supply of power to the heater may be stopped or limited for a short time or until the heater or aerosol-forming substrate is replaced.

The system may comprise a puff detector for detecting when a user is puffing on the system, wherein the puff detector is connected to the electric circuitry and wherein the electric circuitry is configured to supply power from the power supply to the heater element when a puff is detected by the puff detector, and wherein the electrical circuitry is configured to determine if there is an adverse condition during each puff.

The puff detector may be a dedicated puff detector that directly measures air flow through the device, such as a microphone based puff detector, or may detect puffs indirectly, for example, based on changes in temperature with in the device or changes in electrical resistance of the heater element.

The electric circuitry may be configured to supply a predetermined power to the heater element for a time period $t_1$ following an initial detection of a puff or initial supply of power to the heater, and the electric circuitry may be configured to determine the change in electrical resistance of the heater element based on a measure of the electrical resistance of the heater element at time $t_1$ during each puff. Time period $t_1$ may be chosen to be soon after the initial detection of a puff or soon after first application of power to the heater. This is particularly advantageous during first use following replacement of a consumable if the circuitry is detecting an incompatible or counterfeit heater or aerosol-forming substrate. For example, a typical puff may have a duration of 3 s and the response time of the puff detector may be about 100 ms. Then $t_1$ may be chosen to be between 100 ms and 500 ms, during the period of the puff before the temperature of the heater stabilises. Alternatively, time period $t_1$ may be chosen to be when the temperature of the heating element is expected to have stabilised.

The electric circuitry may be configured to prevent the supply of power to the heater element from the power supply if there is an adverse condition for a predetermined number of sequential user puffs.

The electric circuitry may be configured to continually determine if there is an adverse condition, and to prevent or reduce the supply of power to the heater when there is an adverse condition and continue to prevent or reduce the supply of power to the heater element until there is no longer an adverse condition.

In a liquid and wick based system, excessive puffing may result in drying of the wick as liquid cannot be replaced quickly enough near the heater. In these circumstances it is desirable to limit the supply of power to the heater so that the heater does not get too hot and produce undesirable aerosol constituents. As soon as an adverse condition is detected, then the power to the heater may be stopped until a subsequent user puff.

Similarly, excessive puffing may not allow the heater to cool as expected between puffs, resulting in a gradual, undesirable rise in the temperature of the heater from puff to puff. This is true of liquid or solid aerosol-forming substrate based systems. To monitor cooling between puffs, the electric circuitry may be configured to track the ratio over time, and if a difference between a maximum value for the ratio and a subsequent minimum value for the ratio does not exceed a difference threshold stored in memory, may limit the power supplied to the heater or provide an indication.

The electric circuitry may be configured to prevent the supply of power to the heater element for a predetermined stop time period when there is an adverse condition.

The electric circuitry may be configured to prevent the supply of power to the heater until a consumable portion containing the aerosol-forming substrate or the heater is replaced.

Alternatively, or in addition, the electric circuitry may be configured to continually calculate whether the ratio has reached a threshold value, and to compare the time taken for the ratio to reach the threshold value with a stored time value, and if the time taken for the threshold value to be reached is less than the stored time value, or if the ration does not reach the threshold value in an expected time period, determining that there is an adverse condition and to prevent or reduce the supply of power to the heater. If the threshold value is reached more quickly than expected then it may be indicative of a dry heater element or dry substrate or may be indicative of an incompatible, counterfeit or damaged heater. Similarly if the threshold value is not reached within an expected time period then it may be indicative of a counterfeit or damaged heater or substrate. This may allow for a fast determination of counterfeit, damaged or incompatible heater or substrate.

As described, as well as being indicative of dry conditions at the heater element, a finding of an adverse condition may be indicative of a heater that has electrical properties outside of the range of expected properties. This may be because the heater is faulty, because of a build-up of material on the heater over its lifetime, or because it is an unauthorised or counterfeit heater. For example, if a manufacturer used stainless steel heater elements, those heater elements may be expected to have an initial electrical resistance at room temperature within a particular range of electrical resistance. Furthermore, the ratio between an initial electrical resistance of the heater and a change in electrical resistance from the initial resistance may be expected to have a particular value as it is related to the material of the heater element. If, for example, a heater element formed from Ni—Cr were used, the ratio would be lower that expected as Ni—Cr has a much lower temperature coefficient of resistance than Stainless Steel. Accordingly, the electric circuitry may be configured to determine an adverse condition when a ratio between an initial electrical resistance of the heater and a change in electrical resistance from the initial resistance is less than a minimum threshold, and to limit the supply of power to the heater based on the result. This will prevent the use of some unauthorised heaters. The electric circuitry may prevent the supply of power to the heater if the ratio is lower than the minimum threshold.

Multiple different thresholds may be used to give rise to different control strategies for different conditions. For example, a highest threshold and a lowest threshold may be used to set the bounds for requiring replacement of the heater of the substrate before further power is supplied. The electric circuitry may be configured, if the ratio exceeds the highest threshold or is less than the lowest threshold, to prevent the supply of power to the heater until the heater or the aerosol-forming substrate is replaced. One or more intermediate thresholds may be used to detect excessive puffing behaviour that result in dry conditions at the heater. The electric circuitry may be configured, if the intermediate threshold is exceeded, but the highest threshold is not exceeded, to prevent the supply of power to the heater for a particular period of time or until a subsequent user puff. One or more intermediate thresholds could also be used to trigger an indication to the user that the aerosol-forming substrate is almost depleted and will need replacing soon. The electric circuitry may be configured, if the intermediate threshold is exceeded, but the highest threshold is not exceeded, to provide an indication, which may be visible, audible or haptic.

One process for detecting a counterfeit, damaged or incompatible heater is to check the resistance of the heater, or the rate of change of the resistance of the heater, when the heater is first used or inserted into the device or system. The electric circuitry may be configured to measure an initial resistance of the heater element within a predetermined time period after power is supplied to the heater. The predetermined time period may be a short time period and may be between 50 ms and 200 ms. For a heater comprising a mesh heating element, the predetermined time period may be around 100 ms. Preferably, the predetermined time period is between 50 ms and 150 ms. The electric circuitry may be configured to determine an initial rate of change of resistance during the predetermined time period. This may be done by taking a plurality of resistance measurements at different times during the predetermined time period and calculating a rate of change of resistance based on the plurality of resistance measurements. The electric circuitry may be configured to measure an initial resistance of the heater, or an initial rate of change of resistance of the heater, as a separate routine to supplying power to the heater to heat an aerosol-forming substrate, using much lower power, or may measure the initial resistance of the heater during the first few moments that the heater is activated, before significant heating has occurred. The electrical circuitry may be configured to compare the initial resistance of the heater, or the initial rate of change of resistance of the heater, with a range of acceptable values, and if the initial resistance or initial rate of change of resistance is outside the range of acceptable values, may prevent the supply of power to the electric heater, or provide an indication, until the heater or the aerosol-forming substrate is replaced.

If the initial resistance or initial rate of change of resistance is within the range of acceptable values, then the electric circuitry may be configured to determine that there is an acceptable heater when a ratio between the initial electrical resistance of the heater and a change in electrical resistance from the initial resistance is less than the maximum threshold value or is greater than the minimum threshold value stored in the memory, and to control power supplied to the electric heater based on whether there is an acceptable heater, or to provide an indication, if there is not an acceptable heater.

The electric circuitry may be configured to determine that there is an acceptable heater within one second of power first being supplied to the heater.

In a second aspect there is provided a heater assembly comprising:

- an electric heater comprising at least one heating element; and
- electric circuitry connected to the electric heater and comprising a memory, the electric circuitry configured to determine that there is an adverse condition when a ratio between an initial electrical resistance of the heater and a change in electrical resistance from the initial resistance is greater than a maximum threshold value or is less than a minimum threshold value stored in the memory, or when the ratio reaches a threshold value stored in the memory outside of an expected time period, and to control power supplied to the electric heater based on whether there is an adverse condition, or to provide an indication based on whether there is an adverse condition.

The heater assembly may be configured for use in an aerosol-generating system and may be configured to heat an aerosol-forming substrate in use.

In a third aspect, there is provided an electrically operated aerosol-generating device comprising:

- a power supply; and
- electric circuitry connected to the power supply and comprising a memory, the electric circuitry configured to connect to an electric heater in use and to determine an adverse condition when a ratio between an initial electrical resistance of the heater and a change in electrical resistance from the initial resistance is greater than a maximum threshold value or is less than a minimum threshold value stored in the memory, or when the ratio reaches a threshold value stored in the memory outside of an expected time period, and to control the power supplied to the electric heater based on whether there is an adverse condition, or to provide an indication based on whether there is an adverse condition.

In a fourth aspect of the invention, there is provided electric circuitry for use in an electrically operated aerosol-generating device, in use the electric circuitry connected to an electric heater and to a power supply, the electric circuitry comprising a memory, and being configured to determine an adverse condition when a ratio between an initial electrical resistance of the heater and a change in electrical resistance from the initial resistance is greater than a maximum threshold value or is less than a minimum threshold value stored in the memory, or when the ratio reaches a threshold value stored in the memory outside of an expected time period, and to control the power supplied to the electric heater based on whether there is an adverse condition, or to provide an indication based on whether there is an adverse condition.

In a fifth aspect of the invention there is provided electric circuitry for use in an electrically operated aerosol-generating device, in use the electric circuitry connected to an electric heater for heating an aerosol-forming substrate and to a power supply, the electric circuitry comprising a memory, and being configured to measure an initial resistance of the heater, or an initial rate of change of resistance of the heater, within a predetermined time period after power is supplied to the heater, compare the initial resistance of the heater, or the initial rate of change of resistance of the heater, with a range of acceptable values, and if the initial resistance or initial rate of change of resistance is outside the range of acceptable values, prevent the supply of power to the electric heater, or provide an indication, until the heater or the aerosol-forming substrate is replaced.

The predetermined time period may be a short time period and may be between 50 ms and 200 ms. For a heater comprising a mesh heating element, the predetermined time period may be around 100 ms. Preferably, the predetermined time period is between 50 ms and 150 ms. The electric circuitry may be configured to determine an initial rate of change of resistance during the predetermined time period. This may be done by taking a plurality of resistance measurements at different times during the predetermined time period and calculating a rate of change of resistance based on the plurality of resistance measurements.

If the initial resistance is within the range of acceptable resistance values, then the electric circuitry may be configured to determine a ratio between the initial electrical resistance of the heater and a change in electrical resistance from the initial resistance and to compare the ratio with a maximum or minimum threshold value stored in memory, and if the ratio is less than the maximum threshold value or is greater than the minimum threshold value stored in the memory to determine that there is an acceptable heater, and to control power supplied to the electric heater based on whether there is an acceptable heater, or to provide an indication based on whether there is an acceptable heater.

In a sixth aspect, there is provided a method of controlling the supply of power to a heater in an electrically operated aerosol-generating system, the system comprising an electric heater comprising at least one heating element for heating an aerosol-forming substrate, and a power supply for supplying power to the electric heater, the method comprising:

- determining an adverse condition when a ratio between an initial electrical resistance of the heater and a change in electrical resistance from the initial resistance is greater than a maximum threshold value or is less than a minimum threshold value stored in the memory, or when the ratio reaches a threshold value stored in the memory outside of an expected time period, and controlling the power supplied to the electric heater, or providing an indication to a user, in dependence on whether there is an adverse condition.

The method may comprise measuring the initial electrical resistance of the heater element and measuring the electrical resistance of the heater element at a time after initial delivery of power to the electric heater from the power supply.

The method may comprise supplying a constant power to the heater when power is being supplied. Alternatively, variable power may be supplied dependent on other operating parameters. In that case the threshold may be dependent on the power supplied to the heater.

The method may comprise determining the initial electrical resistance before first use of the heater. If the initial resistance is determined before first use of the heater then it can be assumed that the heater element is at around room temperature. As the expected change in resistance with time may depend on the initial temperature of the heater element, measuring initial resistance at or close to room temperature allows for narrower bands of expected behaviour to be set.

The method may comprise calculating the initial resistance as an initial measured resistance minus an assumed parasitic resistance resulting from other electrical components and electrical contacts within the system.

The electrically operated aerosol-generating system may comprise a puff detector for detecting when a user is puffing on the system, and the method may comprise supplying power from the power supply to the heater element when a puff is detected by the puff detector, determining if there is an adverse condition during each puff, and preventing the supply of power to the heater element from the power supply if there is an adverse condition for a predetermined number of sequential user puffs.

The method may comprise preventing the supply of power to the heater element from the power supply if there is adverse condition.

The method may comprise continually determining if there is an adverse condition, and preventing the supply of power to the heater when there is an adverse condition and continuing to prevent the supply of power to the heater element until there is no longer an adverse condition.

The method may comprise preventing the supply of power to the heater element for a predetermined stop time period when the there is an adverse condition.

Alternatively, or in addition, the method may comprise continually calculating whether the ratio has exceeded a threshold, and comparing the time taken for the threshold to be reached with a stored time value, and if the time taken for threshold to be reached is less than the stored time value, determining and adverse condition and controlling the supply of power to the heater.

In a seventh aspect, there is provided a method of detecting an incompatible or damaged heater in an electrically operated aerosol-generating system, the system comprising an electric heater comprising at least one heating element for heating an aerosol-forming substrate, and a power supply for supplying power to the electric heater, the method comprising:

determining an incompatible or damaged heater when a ratio between an initial electrical resistance of the heater and a change in electrical resistance from the initial resistance is greater than a maximum threshold value or is less than a minimum threshold value stored in the memory, or when the ratio reaches a threshold value stored in the memory outside of an expected time period.

The method may comprise, if there is determined to be an incompatible heater, preventing the supply of power to the electric heater, or providing an indication, until the heater or the aerosol-forming substrate is replaced.

The method may further comprise measuring an initial resistance of the heater, or an initial rate of change of resistance of the heater, within a predetermined time period after power is supplied to the heater, comparing the initial resistance of the heater or an initial rate of change of resistance of the heater, with a range of acceptable values, and if the initial resistance or initial rate of change of resistance is outside the range of acceptable values, preventing the supply of power to the electric heater, or providing an indication, until the heater or the aerosol-forming substrate is replaced.

The predetermined time period may be a short time period and may be between 50 ms and 200 ms. For a heater comprising a mesh heating element, the predetermined time period may be around 100 ms. Preferably, the predetermined time period is between 50 ms and 150 ms.

Determining an initial rate of change of resistance during the predetermined time period may be achieved by taking a plurality of resistance measurements at different times during the predetermined time period and calculating a rate of change of resistance based on the plurality of resistance measurements.

The method may further comprise detecting when a heater or aerosol-forming substrate is inserted into the system. The method may be performed immediately after a heater or aerosol-forming substrate is detected to have been inserted into the system.

In an eighth aspect of the invention, there is provided a method of detecting an incompatible or damaged heater in an electrically operated aerosol-generating system, the system comprising an electric heater comprising at least one heating element for heating an aerosol-forming substrate, and a power supply for supplying power to the electric heater, the method comprising:

measuring an initial resistance of the heater, or an initial rate of change of resistance of the heater, within a predetermined time period after power is supplied to the heater, comparing the initial resistance or initial rate of change of resistance of the heater with a range of acceptable values, and if the initial resistance or initial rate of change of resistance of the heater is outside the range of acceptable values, preventing the supply of power to the electric heater, or providing an indication, until the heater or the aerosol-forming substrate is replaced.

The predetermined time period may be a short time period and may be between 50 ms and 200 ms. For a heater comprising a mesh heating element, the predetermined time period may be around 100 ms. Preferably, the predetermined time period is between 50 ms and 150 ms.

Determining an initial rate of change of resistance during the predetermined time period may be achieved by taking a plurality of resistance measurements at different times during the predetermined time period and calculating a rate of change of resistance based on the plurality of resistance measurements.

The method may further comprise detecting when a heater or aerosol-forming substrate is inserted into the system. The method may be performed immediately after a heater or aerosol-forming substrate is detected to have been inserted into the system.

In a ninth aspect, there is provided a computer program product directly loadable into the internal memory of a microprocessor comprising software code portions for performing the steps of the sixth, seventh or eighth aspect when said product is run on a microprocessor in an electrically operated aerosol-generating system, the system comprising an electric heater comprising at least one heating element for heating an aerosol-forming substrate, and a power supply for supplying power to the electric heater, the microprocessor connected to the electric heater and to the power supply.

The computer program product may be provided as a downloadable piece of software or recorded on a computer readable storage medium.

According to a tenth aspect, there is provided a computer readable storage medium having stored thereon a computer program according to the ninth aspect.

Features described in relation one aspect of the invention may be applied to other aspects of the invention. In particular, features described in relation to the first aspect may be applicable to the second, third, fourth and fifth aspects of the invention. The features described in relation to the first, second, third fourth and fifth aspects of the invention may also be applicable to the sixth, seventh, and eighth aspects of the invention.

FIGS. 1A to 1D are schematic illustrations of an aerosol-generating system, including a cartridge in accordance with an embodiment of the invention. FIG. 1A is a schematic view of an aerosol-generating device 10 and a separate cartridge 20, which together form the aerosol-generating system. In this example, the aerosol-generating system is an electrically operated smoking system.

The cartridge 20 contains an aerosol-forming substrate and is configured to be received in a cavity 18 within the device. Cartridge 20 should be replaceable by a user when the aerosol-forming substrate provided in the cartridge is depleted. FIG. 1A shows the cartridge 20 just prior to insertion into the device, with the arrow 1 in FIG. 1A indicating the direction of insertion of the cartridge.

Figure 1B:
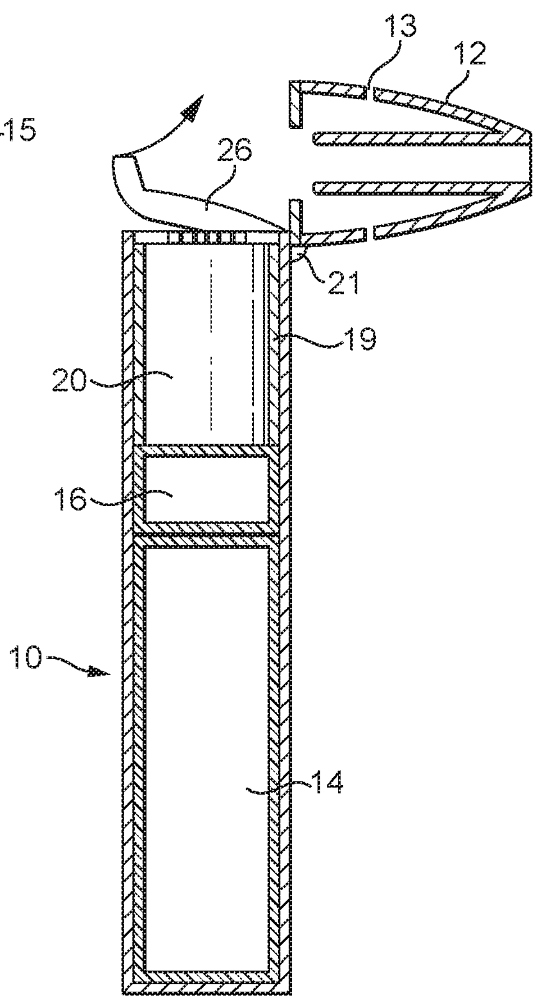
Figure 1C:
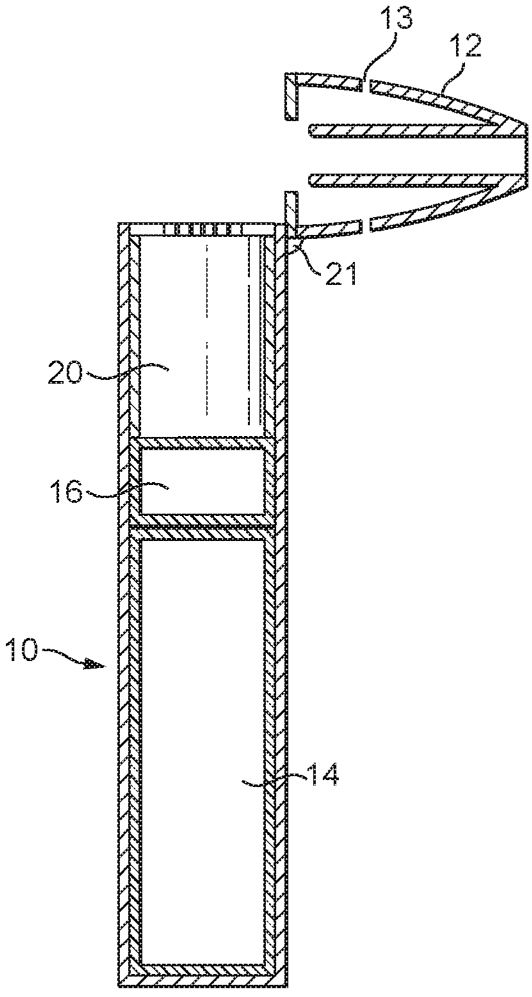
Figure 1D:
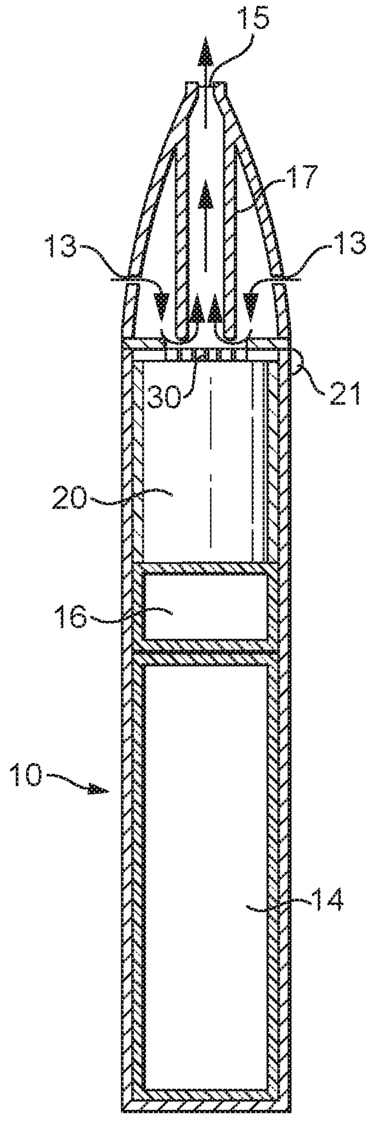

The aerosol-generating device 10 is portable and has a size comparable to a conventional cigar or cigarette. The device 10 comprises a main body 11 and a mouthpiece portion 12. The main body 11 contains a battery 14, such as a lithium iron phosphate battery, electric circuitry 16 and a cavity 18. The electric circuitry 16 comprises a programmable microprocessor. The mouthpiece portion 12 is connected to the main body 11 by a hinged connection 21 and can move between an open position as shown in FIGS. 1A to 1C and a closed position as shown in FIG. 1D. The mouthpiece portion 12 is placed in the open position to allow for insertion and removal of cartridges 20 and is placed in the closed position when the system is to be used to generate aerosol. The mouthpiece portion comprises a plurality of air inlets 13 and an outlet 15. In use, a user sucks or puffs on the outlet to draw air from the air inlets 13, through the mouthpiece portion to the outlet 15, and thereafter into the mouth or lungs of the user. Internal baffles 17 are provided to force the air flowing through the mouthpiece portion 12 past the cartridge.

The cavity 18 has a circular cross-section and is sized to receive a housing 24 of the cartridge 20. Electrical connectors 19 are provided at the sides of the cavity 18 to provide an electrical connection between the control electronics 16 and battery 14 and corresponding electrical contacts on the cartridge 20.

FIG. 1B shows the system of FIG. 1A with the cartridge inserted into the cavity 18, and the cover 26 being removed. In this position, the electrical connectors rest against the electrical contacts on the cartridge.

FIG. 1C shows the system of FIG. 1B with the cover 26 fully removed and the mouthpiece portion 12 being moved to a closed position.

FIG. 1D shows the system of FIG. 1C with the mouthpiece portion 12 in the closed position. The mouthpiece portion 12 is retained in the closed position by a clasp mechanism. The mouthpiece portion 12 in a closed position retains the cartridge in electrical contact with the electrical connectors 19 so that a good electrical connection is maintained in use, whatever the orientation of the system is.

Figure 2:
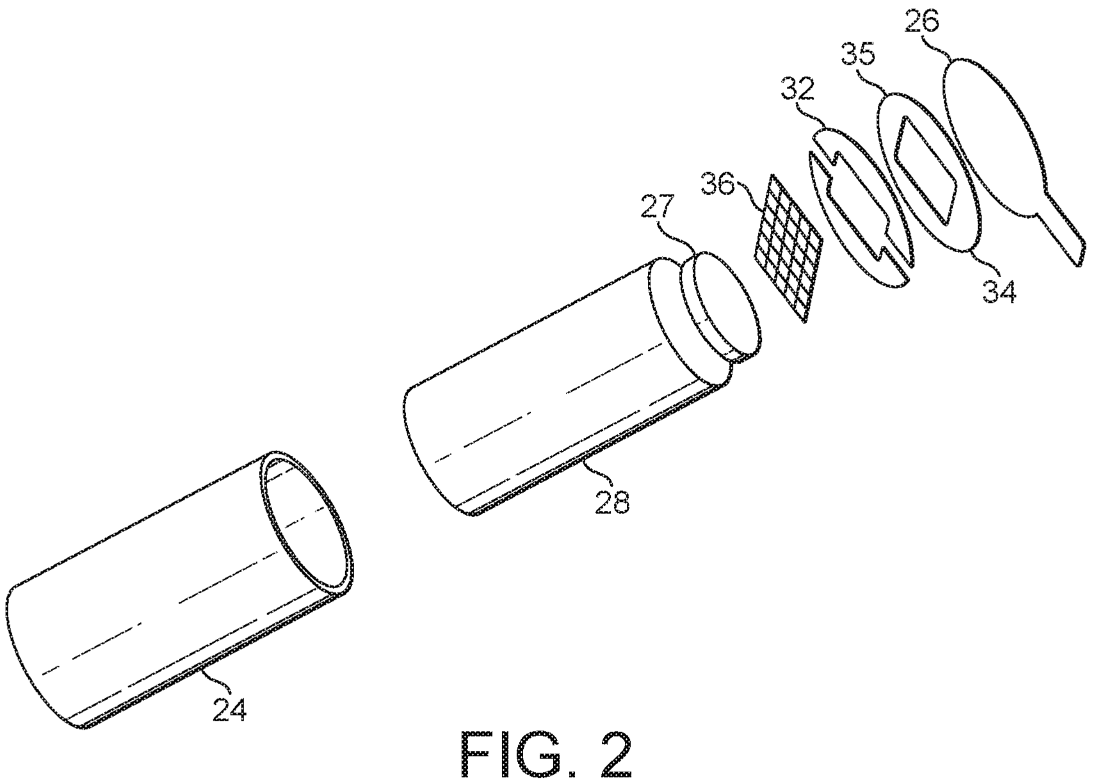
FIG. 2 is an exploded view of a cartridge for use in a system as shown in FIGS. 1A to 1D.

FIG. 2 is an exploded view of the cartridge 20. The cartridge 20 comprises a generally circular cylindrical housing 24 that has a size and shape selected to be received into the cavity 18. The housing contains capillary material 27, 28 that is soaked in a liquid aerosol-forming substrate. In this example the aerosol-forming substrate comprises 39% by weight glycerine, 39% by weight propylene glycol, 20% by weight water and flavourings, and 2% by weight nicotine. A capillary material is a material that actively conveys liquid from one end to another, and may be made from any suitable material. In this example the capillary material is formed from polyester.

The housing has an open end to which a heater assembly 30 is fixed. The heater assembly 30 comprises a substrate 34 having an aperture 35 formed in it, a pair of electrical contacts 32 fixed to the substrate and separated from each other by a gap 33, and a plurality of electrically conductive heater filaments 36 spanning the aperture and fixed to the electrical contacts on opposite sides of the aperture 35.

The heater assembly 30 is covered by a removable cover 26. The cover comprises a liquid impermeable plastic sheet that is glued to the heater assembly but which can be easily peeled off. A tab is provided on the side of the cover to allow a user to grasp the cover when peeling it off. It will now be apparent to one of ordinary skill in the art that although gluing is described as the method to a secure the impermeable plastic sheet to the heater assembly, other methods familiar to those in the art may also be used including heat sealing or ultrasonic welding, so long as the cover may easily be removed by a consumer.

There are two separate capillary materials 27, 28 in the cartridge of FIG. 2. A disc of a first capillary material 27 is provided to contact the heater element 36, 32 in use. A larger body of a second capillary material 28 is provided on an opposite side of the first capillary material 27 to the heater assembly. Both the first capillary material and the second capillary material retain liquid aerosol-forming substrate. The first capillary material 27, which contacts the heater element, has a higher thermal decomposition temperature (at least 160°C or higher such as approximately 250° C.) than the second capillary material 28. The first capillary material 27 effectively acts as a spacer separating the heater element 36, 32 from the second capillary material 28 so that the second capillary material is not exposed to temperatures above its thermal decomposition temperature. The thermal gradient across the first capillary material is such that the second capillary material is exposed to temperatures below its thermal decomposition temperature. The second capillary material 28 may be chosen to have superior wicking performance to the first capillary material 27, may retain more liquid per unit volume than the first capillary material and may be less expensive than the first capillary material. In this example the first capillary material is a heat resistant material, such as a fiberglass or fiberglass containing material and the second capillary material is a polymer such as suitable capillary material. Exemplary suitable capillary materials include the capillary materials discussed herein and in alternative embodiments may include high density polyethylene (HDPE), or polyethylene terephthalate (PET).

Figure 3:
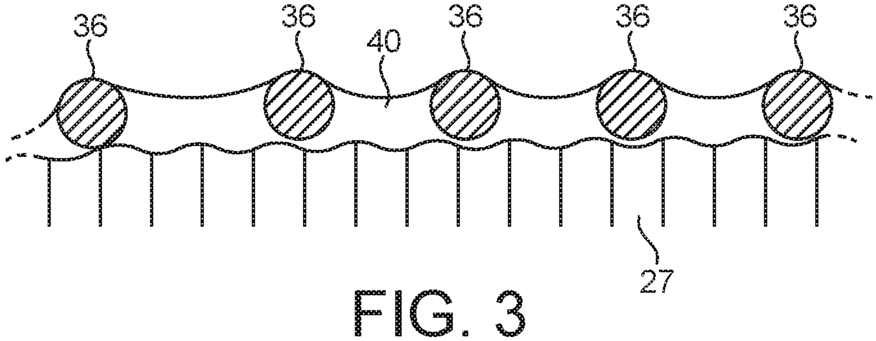
FIG. 3 is a detailed view of the filaments of the heater, showing a meniscus of liquid aerosol-forming substrate between the filaments.

The capillary material 27, 28 is advantageously oriented in the housing 24 to convey liquid to the heater assembly 30. When the cartridge is assembled, the heater filaments 36, 37, 38 may be in contact with the capillary material 27 and so aerosol-forming substrate can be conveyed directly to the mesh heater. FIG. 3 is a detailed view of the filaments 36 of the heater assembly, showing a meniscus 40 of liquid aerosol-forming substrate between the heater filaments 36. It can be seen that aerosol-forming substrate contacts most of the surface of each filament so that most of the heat generated by the heater assembly passes directly into the aerosol-forming substrate.

So, in normal operation, liquid aerosol-forming substrate contacts a large portion of the surface of the heater filaments 36. However, when most of the liquid substrate in the cartridge has been used, less liquid aerosol-forming substrate will be delivered to the heater filaments. With less liquid to vaporize, less energy is taken up by the enthalpy of vaporization and more of the energy supplied to the heating filaments is directed to raising the temperature of the heating filaments. So as the heater element dries out, the rate of increase of temperature of the heater element for a given applied power will increase. The heater element may dry out because the aerosol-forming substrate in the cartridge is almost used up or because the user is taking very long or very frequent puffs and the liquid can not be delivered to the heater filaments as fast as it is being vaporized.

In use, the heater assembly operates by resistive heating. Current is passed through the filaments 36 under the control of control electronics 16, to heat the filaments to within a desired temperature range. The mesh or array of filaments has a significantly higher electrical resistance than the electrical contacts 32 and electrical connectors 19 so that the high temperatures are localised to the filaments. In this example, the system is configured to generate heat by providing electrical current to the heater assembly in response to a user puff. In another embodiment the system may be configured to generate heat continuously while the device is in an "on" state. Different materials for the filaments may be suitable for different systems. For example, in a continuously heated system, Ni—Cr filaments are suitable as they have a relatively low specific heat capacity and are compatible with low current heating. In a puff actuated system, in which heat is generated in short bursts using high current pulses, stainless steel filaments, having a high specific heat capacity may be more suitable.

The system includes a puff sensor configured to detect when a user is drawing air through the mouthpiece portion. The puff sensor (not illustrated) is connected to the control electronics 16 and the control electronics 16 are configured to supply current to the heater assembly 30 only when it is determined that the user is puffing on the device. Any suitable air flow sensor may be used as a puff sensor, such as a microphone or pressure sensor.

In order to detect this increase in the rate of temperature change, the electric circuitry 16 is configured to measure the electrical resistance of the heater filaments. The heater filaments in this example are formed from stainless steel, and so have a positive temperature coefficient of resistance. This means that as the temperature of the heater filaments rises so does their electrical resistance.

Figure 4:
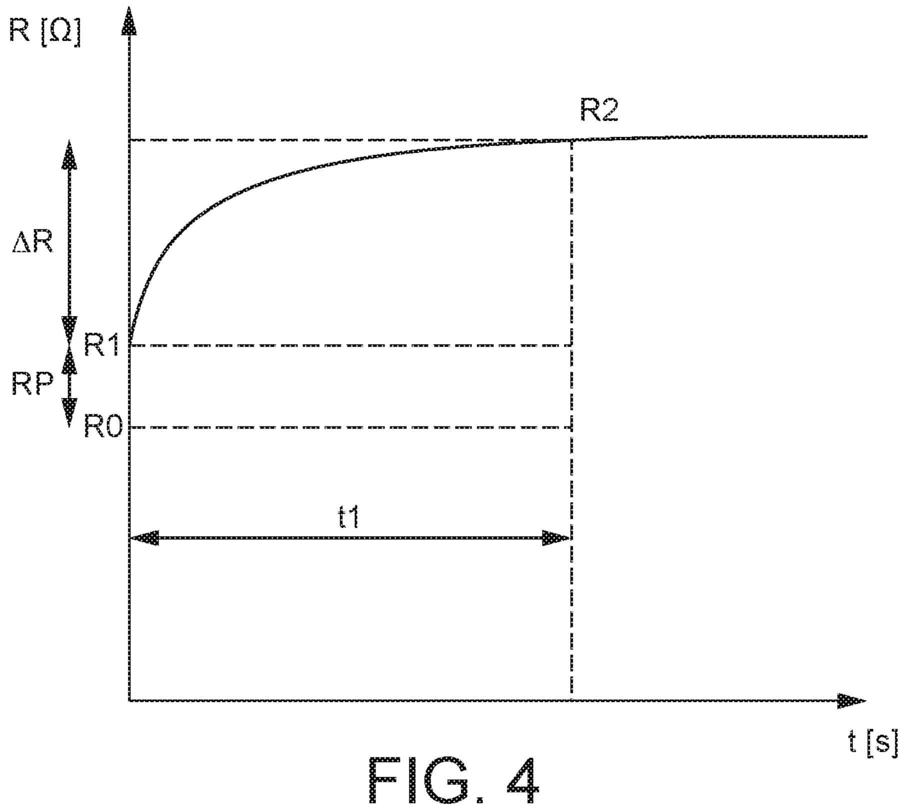
FIG. 4 is a schematic illustration of the change of resistance of the heater during a user puff.

FIG. 4 is a schematic illustration of the change of resistance of the heater during a user puff. The x-axis is time after initial detection of a user puff and the resulting supply of power to the heater. The y-axis is electrical resistance of the heater assembly. It can be seen that the heater assembly has an initial resistance R1 before any heating has occurred. R1 is made up of a parasitic resistance RP resulting from the electrical contacts 32 and electrical connectors 19 and the contact between them, and the resistance of the heater filaments R0. As power is applied to the heater during a user puff, the temperature of the heater filaments rises and so the electrical resistance of the heater filaments rises. As illustrated, at time $t_1$ the resistance of the heater assembly is R2. The change in electrical resistance of the heater assembly from the initial resistance to the resistance at time $t_1$ is therefore $\Delta R = R2 - R1$.

In this example the parasitic resistance RP is assumed to not change as the heater filaments heat up. This is because RP is attributable to non-heated components, such as the electrical contacts 32 and electrical connectors 19. The value of RP is assumed to be the same for all cartridges and a value is stored in the memory of the electric circuitry.

The relationship between the resistance of the heater filaments and their temperature is given by the following equation:

$$R2 = R0*(1+\alpha*\Delta T)+RP \quad (1)$$

where $\alpha$ is the temperature coefficient of electrical resistance of the heater filaments and $\Delta T$ is the change in temperature between an initial temperature before the application of power to the heater and the temperature at time $t_1$.

A threshold value K is stored in the electric circuitry, where K is equal to $\alpha*\Delta T_{max}$. If the temperature rises by more than $\Delta T_{max}$ in time $t_1$ then there is considered to be an adverse condition, such as dry conditions at the heater.

From Equation 1:

$$K = \alpha*\Delta T\text{max} = \Delta R/R0 \quad (2)$$

So in order to detect a rapid increase in temperature indicative of dry conditions at the heater filaments the value of the ratio $\Delta R/R0$ can be compared with a stored value of K. If $\Delta R/R0 > K$ then there are dry conditions at the heater.

This comparison can be performed by the electric circuitry but the inequality can be rearranged to suit the electronic processing operation, in particular to avoid the need to perform any division. In this example, software running on microprocessor in the electric circuitry performs the following comparison, derived from Equation 1:

If $R2 > (R1*(K+1) - K*RP)$ then there are dry conditions at the heater (3)

R2 and R1 are both measured values and K and RP are stored in memory. Ideally the value of R1 is measured before any heating takes place, in other words before first activation of the heater, and that measured value is used for all subsequent puffs. This avoids any error resulting from residual heat from previous puffs. R1 may be measured only once for each cartridge and a detection system used to determine when a new cartridge is inserted, or R1 may be measured each time the system is switched on.

Figure 9:
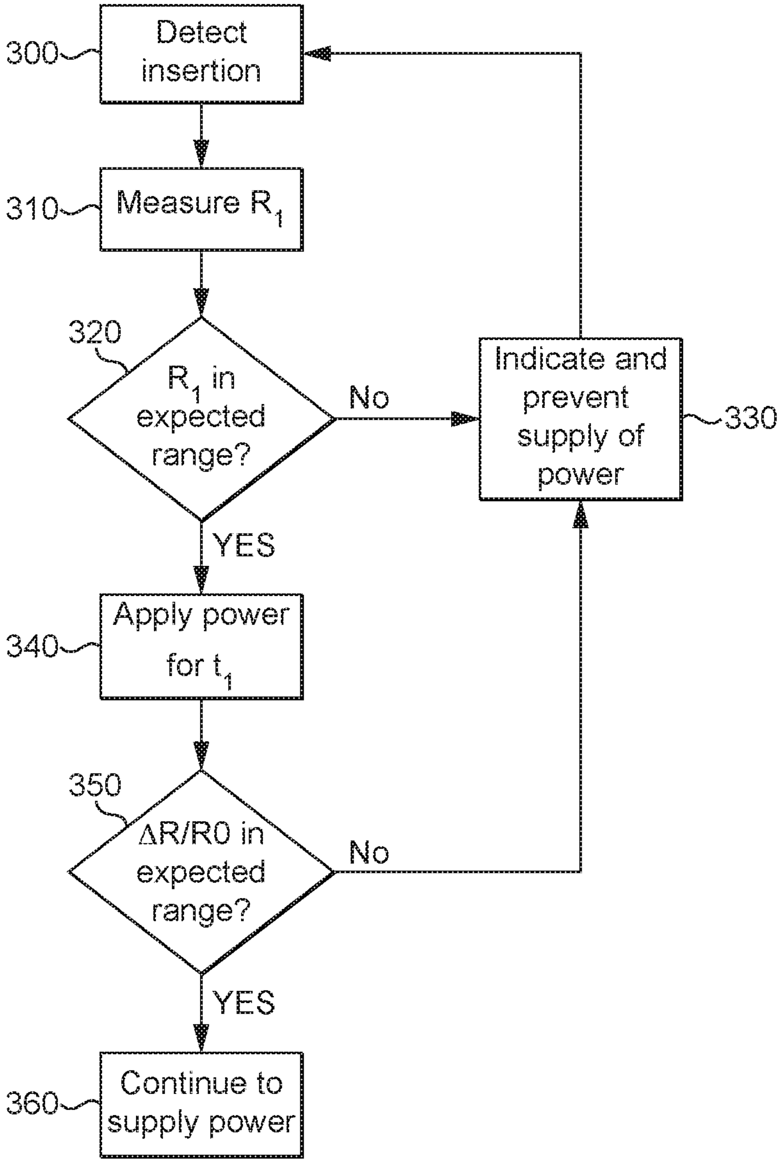
FIG. 9 is flow chart illustrating a method for detecting an unauthorised, damaged or incompatible heater.

Other adverse conditions besides dry heater conditions may be detected in this way. If a cartridge having a heater formed from a material having a different temperature coefficient of resistance is used in the system, the electric circuitry can detect that and may be configured not to supply power to it. In the present example, the heater filaments are formed from stainless steel. A cartridge having a heater formed from Ni—Cr would have a lower temperature coefficient of resistance, meaning that its resistance would rise more slowly with increasing temperature. So if a value K2, which equals $\alpha*\Delta T_{min}$, is stored in memory, which corresponds to the lowest temperature rise in time $t_1$ expected for a stainless steel heater element, then if $R2 < (R1*(K2+1) - K*RP)$ then the circuitry determines an adverse condition corresponding to an unauthorized cartridge being present in the system. FIG. 9 illustrates a process for detecting an incompatible heater.

So the system may be configured to compare R2 or ΔR/R0, or even ΔR/R1 with a stored high threshold and a stored low threshold in order to determine an adverse condition. R1 may also be compared with a threshold or thresholds to check that it is within an expected range. They may even be more than one high stored threshold and different actions taken depending on which high threshold is exceeded. For example, if the highest threshold is exceeded then the circuitry may prevent further supply of power until the heater and/or substrate is replaced. This may be indicative of a completely depleted substrate or a damages or incompatible heater. A lower threshold may be used to determine when the substrate is nearly depleted. If this lower threshold is exceeded, but the higher threshold is not exceeded, then the circuitry may simply provide an indication, such as an illuminated LED, showing that the substrate will soon need to be replaced.

The ratio of ΔR/R0 may be continually monitored to determine if the heater is cooling sufficiently between puffs. If the ratio does not go below a cooling threshold between puffs because a user is puffing very frequently, the electric circuitry may prevent or limit the supply of power to the heater until the ratio falls below the cooling threshold. Alternatively, a comparison may be made between a maximum value of the ratio during a puff and a minimum value for the ratio subsequent to the puff, to determine if sufficient cooling is occurring.

Also, the ratio ΔR/R0 may be continually monitored and the time at which it reaches a threshold value compared with a time threshold. If ΔR/R0 reaches the threshold much faster or slower than expected, then it may be indicative of an adverse condition, such as an incompatible heater. The rate of change of ΔR could also be determined and compared with a threshold. If ΔR rises very quickly or very slowly then it may be indicative of an adverse condition. These techniques may allow for incompatible heaters to be detected very quickly.

Figure 5:
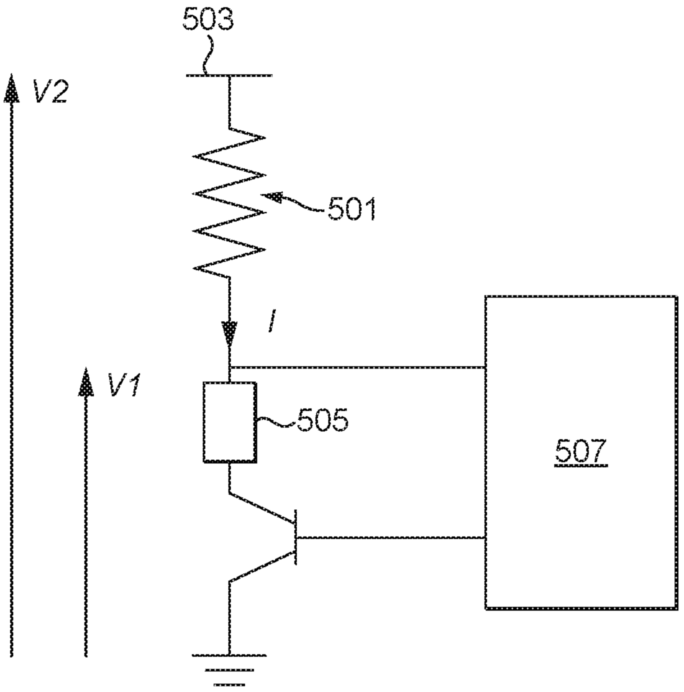
FIG. 5 is an electric circuit diagram showing how the heating element resistance may be measured.

FIG. 5 is a schematic electric circuit diagram showing how the heating element resistance may be measured. In FIG. 5, the heater 501 is connected to a battery 503 which provides a voltage V2. The heater resistance to be measured at a particular time is $R_{heater}$. In series with the heater 501, an additional resistor 505, with known resistance r is inserted connected to voltage V1, intermediate between ground and voltage V2. In order for microprocessor 507 to measure the resistance $R_{heater}$ of the heater 501, the current through the heater 501 and the voltage across the heater 501 can both be determined. Then, the following well-known formula can be used to determine the resistance:

$$V=IR \qquad (4)$$

In FIG. 5, the voltage across the heater is V2−V1 and the current through the heater is I. Thus:

$$R_{heater}V2-V1/I \qquad (5)$$

The additional resistor 505, whose resistance r is known, is used to determine the current I, again using (1) above. The current through the resistor 505 is I and the voltage across the resistor 505 is V1. Thus:

$$I=V1/r \qquad (6)$$

So, combining (5) and (6) gives:

$$R_{heater}=(V2-V1)/V1r \qquad (7)$$

Thus, the microprocessor 507 can measure V2 and V1, as the aerosol generating system is being used and, knowing the value of r, can determine the heater's resistance, $R_{heater}$ at different times.

The electric circuitry can control the supply of power to the heater in several different ways following an adverse condition being detected. Alternatively, or in addition, the electric circuitry may simply provide an indication to the use that an adverse condition has been detected. The system may include an LED or display or may comprise a microphone, and these components may be used to issue an alert of an adverse condition to the user.

Figure 6A:
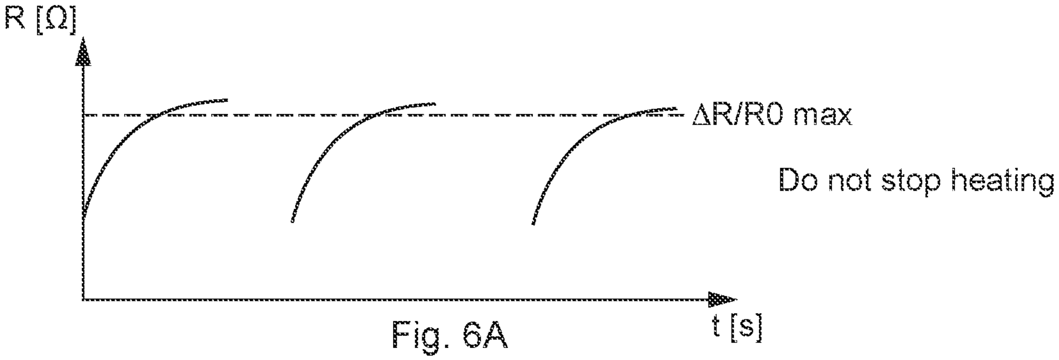
FIGS. 6A, 6B, and 6C illustrate control processes following detection of an adverse condition.

FIG. 6A illustrates a first control process for a puff actuated system. In the scheme illustrated in FIG. 6A, if ΔR/R0 exceeds the high threshold for a single puff, the electric circuitry continues to supply power to the heater. FIG. 6A shows three consecutive puffs during which the high threshold is exceeded. Only if ΔR/R0 exceeds the high threshold for a particular number of consecutive puffs, say 3, 4, or 5 puffs, is power to the heater stopped. A single instance of the threshold being exceeded could be the result of a very long user puff, but several consecutive puffs during which the high threshold is exceeded is more likely to be the result of the cartridge becoming empty. At that point the cartridge may be disabled, for example by blowing a fuse within the cartridge, or the electric circuitry may block the supply of further power until the cartridge is replaced or refilled.

Figure 6B:
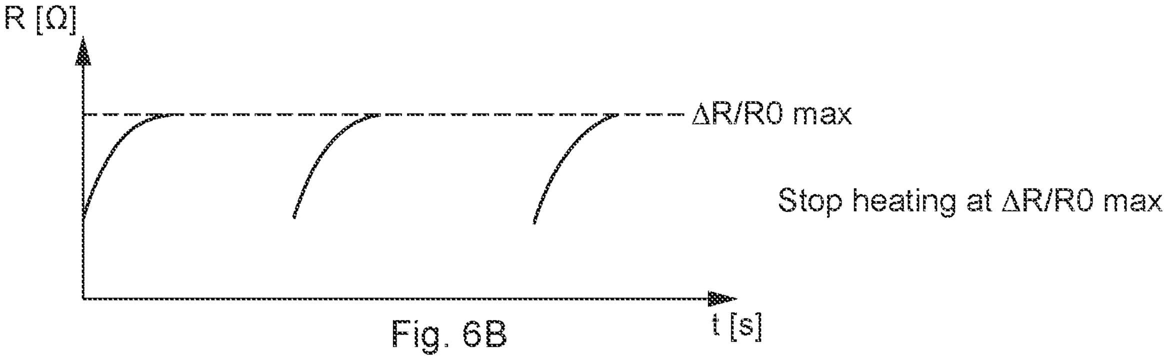

FIG. 6B discloses another control process that may be used as an alternative, or in addition to the process described with reference to FIG. 6B. In the control process of FIG. 6B the electric circuitry stops the supply of power to the heater as soon as it is determined that the high threshold has been exceeded, until the end of the user puff. When a new user puff is detected power is supplied to the heater again. This may be useful to prevent the heater becoming too hot even when the user is puffing excessively. As well as stopping the power, an indication could be provided that the threshold has been reached.

Figure 6C:
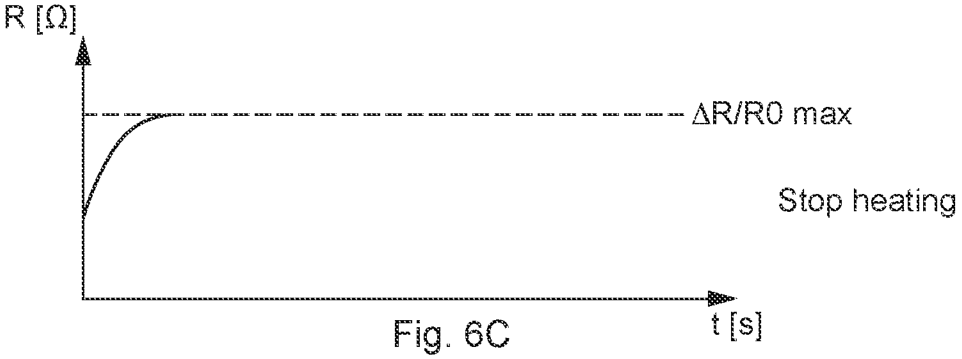

FIG. 6C illustrates an alternative control process in which the electric circuitry stops the supply of power to the heater as soon as it is determined that the high threshold has been exceeded. The supply of power is prevented for subsequent user puffs too. In order for power to be supplied to the heater again, the user may be required to replace the cartridge or perform a resetting operation. This control process may be used in conjunction with the processes described with reference to FIGS. 6A and 6B but on the basis of a higher threshold than is used in the processes described with reference to FIGS. 6A and 6B. The higher threshold may be indicative of a completely depleted aerosol-forming substrate or of a defective or incompatible heater.

Although the invention has been described with reference to a cartridge based system, with a mesh heater, the same adverse condition detection methods can be used in other aerosol-generating systems.

Figure 7:
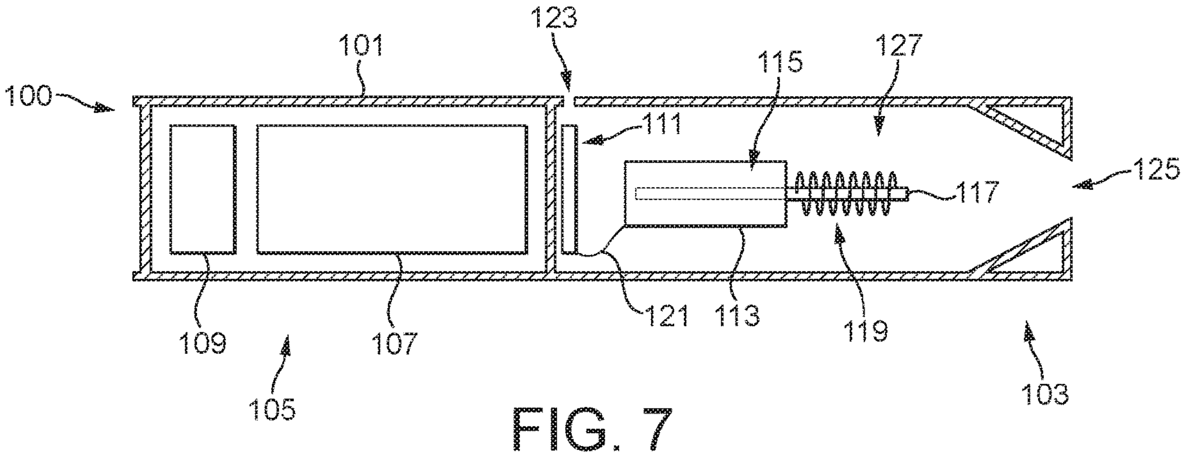
FIG. 7 is a schematic illustration of a first alternative aerosol-generating system.

FIG. 7 illustrates an alternative system, which also uses a liquid substrate and a capillary material, in accordance with the invention. In FIG. 7, the system is a smoking system. The smoking system 100 of FIG. 7 comprises a housing 101 having a mouthpiece end 103 and a body end 105. In the body end, there is provided an electric power supply in the form of battery 107 and electric circuitry 109. A puff detection system 111 is also provided in cooperation with the electric circuitry 109. In the mouthpiece end, there is provided a liquid storage portion in the form of cartridge 113 containing liquid 115, a capillary wick 117 and a heater 119.

Note that the heater is only shown schematically in FIG. 7. One end of capillary wick 117 extends into cartridge 113 and the other end of capillary wick 117 is surrounded by the heater 119. The heater is connected to the electric circuitry via connections 121, which may pass along the outside of cartridge 113 (not shown in FIG. 7). The housing 101 also includes an air inlet 123, an air outlet 125 at the mouthpiece end, and an aerosol-forming chamber 127.

In use, operation is as follows. Liquid 115 is conveyed by capillary action from the cartridge 113 from the end of the wick 117 which extends into the cartridge to the other end of the wick which is surrounded by heater 119. When a user draws on the aerosol generating system at the air outlet 125, ambient air is drawn through air inlet 123. In the arrangement shown in FIG. 7, the puff detection system 111 senses the puff and activates the heater 119. The battery 107 supplies electrical energy to the heater 119 to heat the end of the wick 117 surrounded by the heater. The liquid in that end of the wick 117 is vaporized by the heater 119 to create a supersaturated vapour. At the same time, the liquid being vaporized is replaced by further liquid moving along the wick 117 by capillary action. The supersaturated vapour created is mixed with and carried in the air flow from the air inlet 123. In the aerosol-forming chamber 127, the vapour condenses to form an inhalable aerosol, which is carried towards the outlet 125 and into the mouth of the user.

In the embodiment shown in FIG. 7, the electric circuitry 109 and puff detection system 111 are programmable as in the embodiment of FIGS. 1A to 1D.

The capillary wick can be made from a variety of porous or capillary materials and preferably has a known, pre-defined capillarity. Examples include ceramic- or graphite-based materials in the form of fibres or sintered powders. Wicks of different porosities can be used to accommodate different liquid physical properties such as density, viscosity, surface tension and vapour pressure. The wick must be suitable so that the required amount of liquid can be delivered to the heater when the liquid storage portion has sufficient liquid.

The heater comprises at least one heating wire or filament extending around the capillary wick.

As in the system described with reference to FIGS. 1A to 1D, 2, and 3, the capillary material forming the wick may dry out in the vicinity of the heater wire if the liquid in the cartridge is used up or if the user takes very long, deep puffs. In the same way as described with reference to the system of FIGS. 1A to 1D, 2, and 3, the change in resistance of the heater wire during the first portion of each puff can be used to determine if there is an adverse condition, such as a dry wick.

A system of the type illustrated in FIG. 7 may have considerable variation in heater resistance, even between cartridges of the same type, because of variations in the length of heater wire wrapped around the wick. The invention is particularly advantageous as it does not require the electric circuitry to store a maximum heater resistance value as a threshold; instead it is a resistance increase relative to an initial measured resistance that is used.

Figure 8:
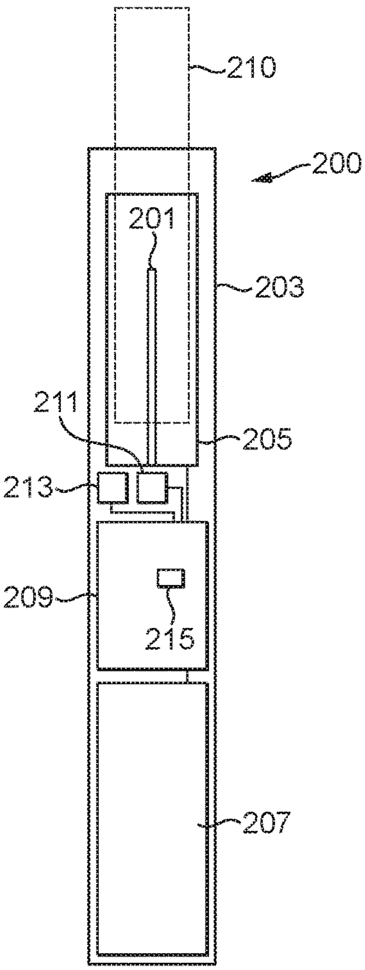
FIG. 8 is a schematic illustration of a second alternative aerosol-generating system.

FIG. 8 illustrates yet another aerosol-generating system which can embody the invention. The embodiment of FIG. 8 is electrically heated tobacco device in which a tobacco based solid substrate is heated, but not combusted, to produce an aerosol for inhalation. In FIG. 8 the components of the aerosol-generating device 700 are shown in a simplified manner and are not drawn to scale. Elements that are not relevant for the understanding of this embodiment have been omitted to simplify FIG. 8.

The electrically heated aerosol-generating device 200 comprises a housing 203 and an aerosol-forming substrate 210, for example a cigarette. The aerosol-forming substrate 210 is pushed inside a cavity 205 formed by the housing 203 to come into thermal proximity with the heater 201. The aerosol-forming substrate 210 releases a range of volatile compounds at different temperatures. By controlling the operation temperature of the electrically heated aerosol-generating device 200 to be below the release temperature of some of the volatile compounds, the release or formation of these smoke constituents can be avoided.

Within the housing 203 there is an electrical power supply 207, for example a rechargeable lithium ion battery. Electric circuitry 209 is connected to the heater 201 and the electrical power supply 207. The electric circuitry 209 controls the power supplied to the heater 201 in order to regulate its temperature. An aerosol-forming substrate detector 213 may detect the presence and identity of an aerosol-forming substrate 210 in thermal proximity with the heater 201 and signals the presence of an aerosol-forming substrate 210 to the electric circuitry 209. The provision of a substrate detector is optional. An airflow sensor 211 is provided within the housing and connected to the electric circuitry 209, to detect the airflow rate through the device.

In the described embodiment the heater 201 is an electrically resistive track or tracks deposited on a ceramic substrate. The ceramic substrate is in the form of a blade and is inserted into the aerosol-forming substrate 210 in use. The heater forms part of the device and may be used for heating many different substrates. However, the heater may be a replaceable component, and replacement heaters may have different electrical resistance.

A system of the type described in FIG. 8 may be a continuously heated system in which the temperature of the heater is maintained at a target temperature while the system in on, or it may be a puff actuated system in the temperature of the heater is raised by supplying more power during periods when a puff is detected.

In the case of a puff actuated system, the operation is very similar to that described with reference to the preceding embodiments. If the substrate is dry in the vicinity of the heater, the heater resistance will rise more quickly for a given applied power than if the substrate still contains aerosol-formers that can be vaporized at relatively low temperature.

In the case of a continuously heated system, there will be a temperature drop of the heater initially when a used puffs on the system due to the cooling effect of airflow past the heater. The heater resistance can be measured when a puff is first detected and recorded as R1 and the subsequent resistance R2 as the system bring the heater back up to the target temperature can be measured at time $t_1$ after puff detection, in a similar manner as described. ΔR and R0 can then be calculated as previously described and the ratio of ΔR/R0 can then be compared to a stored threshold, as previously described to determine if the substrate is dry in the vicinity of the heater. The substrate may be dry because it has been depleted through use or because it is old or has been improperly stored, or because it is counterfeit and has a different moisture content to a genuine aerosol-forming substrate.

The system of FIG. 8 includes a warning LED 215 in the electric circuitry 209 which is illuminated when an adverse condition is detected.

FIG. 9 is flow chart illustrating a method for detecting an unauthorised, damaged or incompatible heater. In a first step 300, the insertion of a cartridge, including the heater, into the device is detected. Then the electrical resistance of the heater R1 is measured in step 300. This occurs a predetermined time period after power is supplied to the heater, such as 100 ms. In step 320 the measured resistance R1 is compared with a range of expected or acceptable resistances. The range of acceptable resistances takes account of manufacturing tolerances and variations between genuine heaters and substrates. If R1 is outside of the expected range then the process proceeds to step 330, in which an indication, such as an audible alarm, is provided and power is prevented from being supplied to the heater as it is considered to be incompatible with the device. The process then returns to step 300, waiting for detection of the insertion of a new cartridge.

As an alternative, or in addition, to measuring an initial resistance R1 in step 300, an initial rate of change of resistance may be measured within a predetermined time period, say 100 ms, after power is supplied to the heater. This may be done by taking a plurality of resistance measurements at different times during the predetermined time period and then calculating an initial rate of change of resistance from the plurality of resistance measurements and the times at which those measurements were taken. In the same way that a particular design of heater can be expected to have an initial resistance within a range of acceptable values, a particular design of heater can be expected to have an initial rate of change of resistance for a given applied power within an acceptable range of rate of change of resistance values. The calculated initial rate of change of resistance can be compared to an acceptable range of rate of change of resistance values and if the calculated rate of change of resistance is outside of the acceptable range, then the process proceeds to step 330.

If in step 320 it is determined that R1 is in the range of expected resistance, then the process proceeds to step 340. In step 340, power is applied to the heater for a time period $t_1$, after which the ratio ΔR/R0 is calculated. Advantageously, $t_1$ is chosen to be a short time period, before significant generation of aerosol. In step 350 the value of the ratio ΔR/R0 is compared with a range of expected or acceptable values. The range of expected values again takes account of variations in the manufacture of the heater and substrate assembly. If the value of ΔR/R0 is outside of the expected range, the heater is considered incompatible and the process goes to step 330, as previously described, and then returns to step 300. If the value of ΔR/R0 is inside the expected range, then the process proceeds to step 360, in which power is supplied to the heater to allow for the generation of aerosol on demand by the user.

Although the invention has been described with reference to three different types of electrical smoking systems, it should be clear that it is applicable to other aerosol-generating systems.

It should also be clear that the invention may be implemented as a computer program product for execution on programmable controllers within existing aerosol-generating systems. The computer program product may be provided as a downloadable piece of software or on a computer readable medium such as a compact disc.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. An electrically operated aerosol-generating system, comprising:
- an electric heater comprising at least one heating element configured to heat an aerosol-forming substrate;
- a power supply; and
- electric circuitry for an electrically operated aerosol-generating device, in use the electric circuitry being connected to the electric heater configured to heat the aerosol-forming substrate and to the power supply, the electric circuitry comprising a memory, and being configured to:
  - measure an initial resistance, or an initial rate of change of resistance, of the electric heater within a predetermined time period after power is supplied to the electric heater,
  - compare the initial resistance or the initial rate of change of resistance of the electric heater with a range of acceptable values,
  - if the initial resistance or the initial rate of change of resistance is outside the range of acceptable values, prevent the supply of power to the electric heater, or provide an indication, until the electric heater or the aerosol-forming substrate is replaced, and
  - measure the initial resistance, or the initial rate of change of resistance as a separate routine to supplying power to the electric heater to heat the aerosol-forming substrate, using lower power.

2. The electrically operated aerosol-generating system according to claim 1,
- further comprising the electrically operated aerosol-generating device and a removable cartridge,
- wherein the power supply and the electric circuitry are in the electrically operated aerosol-generating device and the electric heater is in the removable cartridge, and
- wherein the removable cartridge comprises the liquid aerosol-forming substrate.

3. The electrically operated aerosol-generating system according to claim 1, wherein, in use, the aerosol-forming substrate is in contact with the at least one heating element.

4. The electrically operated aerosol-generating system according to claim 1, wherein the predetermined time period is between 50 ms and 200 ms.

5. The electrically operated aerosol-generating system according to claim 1, wherein the predetermined time period is between 50 ms and 150 ms.

6. The electrically operated aerosol-generating system according to claim 1, wherein, if the initial resistance or the initial rate of change of resistance is within the range of acceptable values, then the electric circuitry is further configured to
- determine that there is an acceptable heater when a ratio between the initial electrical resistance of the electric heater and a change in electrical resistance from the initial resistance is less than a maximum threshold value or is greater than a minimum threshold value stored in the memory, and
- control power supplied to the electric heater based on whether there is the acceptable heater, or to provide the indication, if there is not the acceptable heater.

7. The electrically operated aerosol-generating system according to claim 6, wherein the electric circuitry is further configured to determine that there is the acceptable heater within one second of power first being supplied to the electric heater.

8. The electrically operated aerosol-generating system according to claim 1, wherein the system is an electrically heated smoking system.

9. A heater assembly, comprising:

an electric heater comprising at least one heating element; and electric circuitry for an electrically operated aerosol-generating device, in use the electric circuitry being connected to the electric heater configured to heat an aerosol-forming substrate and to a power supply, the electric circuitry comprising a memory, and being configured to:

measure an initial resistance, or an initial rate of change of resistance, of the electric heater within a predetermined time period after power is supplied to the electric heater, compare the initial resistance or the initial rate of change of resistance of the electric heater with a range of acceptable values, if the initial resistance or the initial rate of change of resistance is outside the range of acceptable values, prevent the supply of power to the electric heater, or provide an indication, until the electric heater or the aerosol-forming substrate is replaced, and measure the initial resistance, or the initial rate of change of resistance, as a separate routine to supplying power to the electric heater to heat the aerosol-forming substrate, using lower power.

10. An electrically operated aerosol-generating device, comprising:

a power supply; and electric circuitry connected to the power supply and comprising a memory, the electric circuitry being configured to connect to an electric heater in use, measure an initial resistance, or an initial rate of change of resistance, of the electric heater within a predetermined time period after power is supplied to the electric heater, compare the initial resistance or the initial rate of change of resistance of the electric heater with a range of acceptable values, if the initial resistance or the initial rate of change of resistance is outside the range of acceptable values, to prevent the supply of power to the electric heater, or provide an indication, until the electric heater or the aerosol-forming substrate is replaced, and measure the initial resistance, or the initial rate of change of resistance, as a separate routine to supplying power to the electric heater to heat the aerosol-forming substrate, using lower power.

11. A method of detecting an incompatible or damaged heater in an electrically operated aerosol-generating system, the system comprising an electric heater comprising at least one heating element configured to heat an aerosol-forming substrate, and a power supply configured to supply power to the electric beater, the method comprising:

measuring an initial resistance, or an initial rate of change of resistance, of the electric heater within a predetermined time period after power is supplied to the electric heater;

comparing the initial resistance or the initial rate of change of resistance of the electric heater with a range of acceptable values; and if the initial resistance or the initial rate of change of resistance is outside the range of acceptable values, preventing the supply of power to the electric heater, or providing an indication, until the electric heater or the aerosol-forming substrate is replaced, wherein the step of measuring the initial resistance, or the initial rate of change of resistance, is performed as a separate routine to supplying power to the electric heater to heat the aerosol-forming substrate, using lower power.

12. The method according to claim 11, further comprising detecting when the electric heater or the aerosol-forming substrate is inserted into the electrically operated aerosol-generating system.

13. The method according to claim 12, wherein the step of measuring the initial resistance, or the initial rate of change of resistance, is performed immediately after the electric heater or the aerosol-forming substrate is detected to have been inserted into the electrically operated aerosol-generating system.

* * * * *